United States Patent [19]

Gruden et al.

[11] Patent Number: 5,441,317

[45] Date of Patent: Aug. 15, 1995

[54] SUPERLOCK FEATURE FOR AN AUTOMOTIVE DOOR LOCKING ACTUATOR

[75] Inventors: James M. Gruden, Centerville; Ned L. Kikly, Vandalia, both of Ohio

[73] Assignee: ITT Automotive Electrical Systems Inc., Auburn Hills, Mich.

[21] Appl. No.: 76,725

[22] Filed: Jun. 14, 1993

[51] Int. Cl.⁶ ............................................. E05B 53/00
[52] U.S. Cl. ................... 292/336.3; 292/144; 292/201; 70/264; 70/277
[58] Field of Search ............ 292/201, 336.3, 142, 292/144, DIG. 23, DIG. 26; 70/190, 275, 277, 279–283, 264

[56] References Cited

U.S. PATENT DOCUMENTS

| | | | |
|---|---|---|---|
| 4,342,209 | 8/1982 | Kleefeldt | 70/264 |
| 4,723,454 | 2/1988 | Periou et al. | 292/201 X |
| 4,735,447 | 4/1988 | Kleefeldt | 292/201 X |
| 4,932,690 | 6/1990 | Kleefeldt et al. | 292/336.3 X |
| 4,978,155 | 12/1990 | Kobayashi | 292/336.3 |
| 4,986,098 | 1/1991 | Fisher | 70/264 X |
| 5,054,300 | 10/1991 | Nakahara et al. | 70/264 X |
| 5,137,312 | 8/1992 | Tang | 292/336.3 |
| 5,149,156 | 9/1992 | Kleefeldt | k292/336.3 |
| 5,216,909 | 6/1993 | Armoogam | 292/144 X |
| 5,308,130 | 5/1994 | Lee | 292/336.3 |

FOREIGN PATENT DOCUMENTS

| | | | |
|---|---|---|---|
| 426535 | 5/1991 | European Pat. Off. | 70/190 |
| 433103 | 6/1991 | European Pat. Off. | 292/DIG. 23 |
| 478013 | 4/1992 | European Pat. Off. | 292/DIG. 23 |

*Primary Examiner*—Peter M. Cuomo
*Assistant Examiner*—Suzanne L. Dino
*Attorney, Agent, or Firm*—Dykema Gossett

[57] ABSTRACT

A superlock assembly includes a motor having a pinion mounted on its output shaft and meshed to an output gear. A blocking arm is secured to the output gear. To engage the superlock assembly when the arm of the locking actuator is extended, the motor is powered to move the blocking arm into the path of the retractable arm. In this position, the arm cannot be retracted either through manual force or electric operation of the actuator, thereby preventing a door latch from being unlocked.

2 Claims, 1 Drawing Sheet

SUPERLOCK FEATURE FOR AN AUTOMOTIVE DOOR LOCKING ACTUATOR

BACKGROUND OF THE INVENTION

1. FIELD OF THE INVENTION

The present invention relates generally to automotive door locks, and in particular is concerned with an actuator for a power door latch.

2. DESCRIPTION OF THE RELATED ART

Power door lock systems for vehicles are well-known. For additional security, some vehicles utilize a "deadbolt locking system" to prevent unwanted unlocking of a power door latch by moving a manual lock operator. Only when a predetermined signal (e.g., a key inserted and rotated in a key cylinder) is generated in such a system will a deadbolt actuator permit a door latch to be unlocked.

SUMMARY OF THE INVENTION

The present invention includes a superlock assembly for an automotive door locking actuator of the type having a retractable arm. The superlock assembly includes a motor having a pinion mounted on its output shaft and meshed to an output gear. A blocking arm is secured to the output gear. To engage the superlock assembly when the arm of the locking actuator is extended, the motor is powered to move the blocking arm into the path of the retractable arm. In this position, the arm cannot be retracted either through manual force or electric operation of the actuator, thereby preventing a door latch from being unlocked.

DETAILED DESCRIPTION OF THE PREFERRED EMBODIMENT

Figure 1:
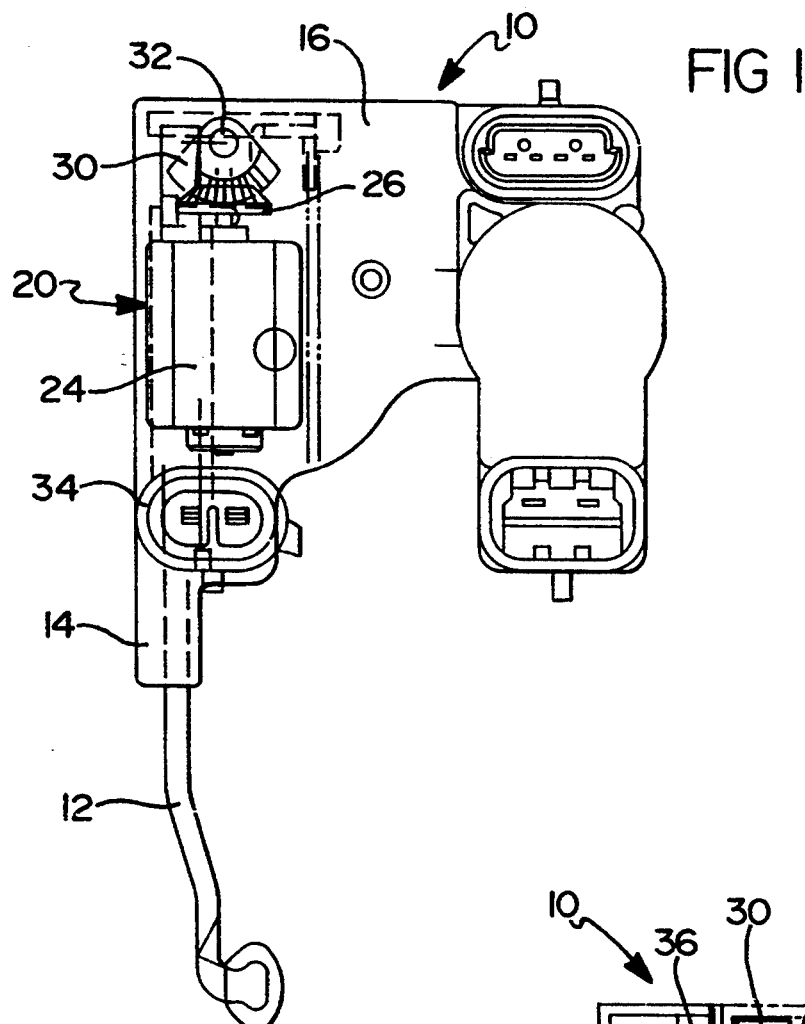
FIG. 1 is a view of an automotive door locking actuator having a superlock assembly combined therewith.

A conventional automotive door locking actuator is indicated generally at 10 in FIG. 1. The actuator 10 is of the type having a reciprocating arm 12 extending from a sleeve 14 of a housing 16. Internally mounted within the housing 16 is an assembly of motor-driven gears (not illustrated) which cause the extension and retraction of the arm 12 in a well-known manner. The actuator 10 is combined with a suitable latch assembly (not illustrated) to provide a power door lock for a vehicle.

A superlock assembly 20 is added to the actuator 10 to selectively prevent the extended arm 12 from being retracted. The assembly 20 includes a housing 22 mounted on housing 16 in any suitable manner. In other embodiments, the housings 22 and 16 can be integrally formed. The housing 22 contains a reversible electric motor 24 having a beveled pinion 26 mounted on an output shaft 28 of the motor 24. The pinion 26 is meshed with an output gear 30 rotatably mounted on a pin 32 fixed in the housing 22. As the output shaft 28 and pinion 26 are rotated, the output gear 30 is rotated. An electrical connector 34 is provided on the housing 22 to supply power to the motor 24.

Figure 2:
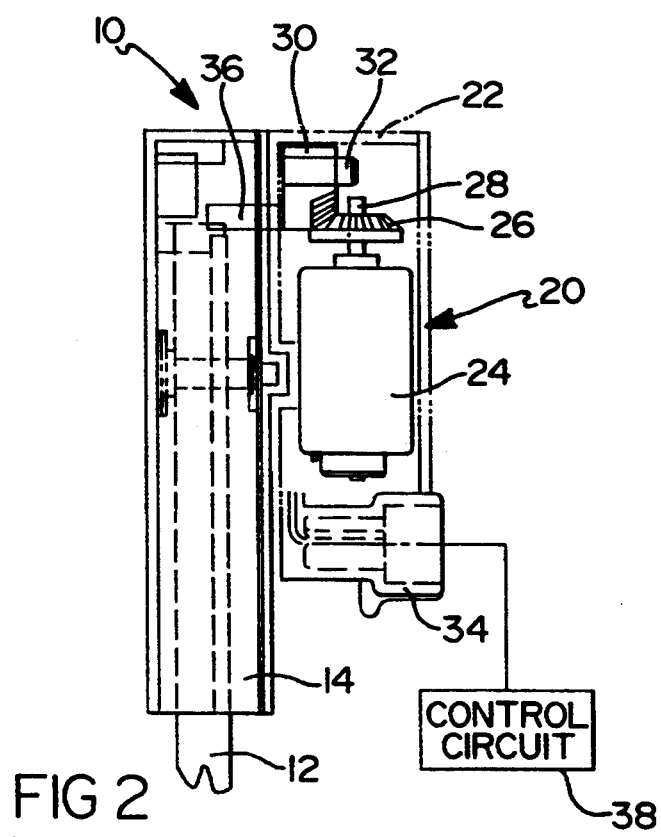
FIG. 2 is a side view of the locking actuator and superlock assembly of FIG. 1 illustrating a blocking arm on an output gear preventing the retraction of an arm of the locking actuator.

As illustrated in FIG. 2, a blocking arm 36 is secured to a lower surface of the output gear 30. The blocking arm 36 projects through windows in housings 22 and 16 to an area inside housing 16 near the innermost end of the retractable arm 12.

In operation, the retractable arm 12 is extended to the locked position by the internal motor-driven gears (not illustrated) of the actuator 10. Motor 24 is then powered to rotate the output gear 30 so that the blocking arm 36 is positioned in the path of the retractable arm 12, as illustrated in FIG. 2. In this position, the blocking arm 36 prevents the retractable arm 12 from moving upwardly to the unlock position. Thus the retractable arm 12 cannot retract either through manual force or electrical operation of actuator 10.

To unlock the retractable arm, motor 24 is powered in the reverse direction, so that the output gear 30 rotates to move the blocking arm 36 out of the path of the retractable arm 12. When the blocking arm 36 is re-positioned, the retractable arm 12 can be unlocked manually or electrically through actuator 10.

Preferably, the actuator 10 and superlock assembly 20 are controlled by an automotive locking circuit 38 including a switch activated by a key cylinder (not illustrated). To place the actuator 10 in a superlocked state, an operator inserts and rotates a key in a driver door key cylinder to close a switch, thereby energizing a relay module to power a superlock assembly 20 at each door to the superlocked state. The motor 24 is powered so that the blocking arm 36 is positioned in the path of arm 12.

When the driver door key is reinserted and rotated, the driver door is mechanically unlocked. The switch is opened to signal the relay module to power the other superlock assemblies to rotate the blocking arms 36 out of the paths of respective arms 12.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A locking assembly for locking an automotive door, comprising:
    (a) a housing including an actuating arm having first and second ends, said actuating arm adapted to slide in a linear direction within said housing;
    (b) a motor mounted in the housing;
    (c) gear means driven by the motor; and
    (d) blocking arm means, connected to the gear means, for abutting at least one of said first and second ends of said actuating arm to prevent the linear movement of said actuator arm in at least one direction.

2. A system for locking an automotive door, comprising:
    (a) a housing including an actuating arm having first and second ends, said actuating arm adapted to slide in a linear direction within said housing;
    (b) drive means mounted in the housing;
    (c) blocking arm means, driven by the drive means for abutting at least one of said first and second ends of said actuating arm to prevent the linear movement of said actuator arm in at least one direction; and
    (d) control means for selectively operating the drive means to position the blocking arm means to prevent retraction of the actuating arm.

* * * * *